(12) United States Patent
Ban et al.

(10) Patent No.: US 11,139,631 B2
(45) Date of Patent: Oct. 5, 2021

(54) USE OF POSITIVE DISPERSION MIRRORS TO MAINTAIN BEAM QUALITY DURING CHIRPED PULSE AMPLIFICATION IN A YB:KYW REGENERATIVE AMPLIFIER

(71) Applicant: Femto Blanc Inc., Lambertville, NJ (US)

(72) Inventors: Vladimir S. Ban, Princeton, NJ (US); Michael B. Orozco, Santa Ana, CA (US)

(73) Assignee: Femto Blanc Inc., Lambertville, NJ (US)

( * ) Notice: Subject to any disclaimer, the term of this patent is extended or adjusted under 35 U.S.C. 154(b) by 0 days.

(21) Appl. No.: 16/864,706

(22) Filed: May 1, 2020

(65) Prior Publication Data

US 2020/0366046 A1   Nov. 19, 2020

Related U.S. Application Data

(60) Provisional application No. 62/841,750, filed on May 1, 2019.

(51) Int. Cl.
| | | |
|---|---|---|
| *H01S 3/10* | (2006.01) | |
| *H01S 3/00* | (2006.01) | |
| *H01S 3/23* | (2006.01) | |
| *H01S 3/081* | (2006.01) | |
| *H01S 3/106* | (2006.01) | |
| *H01S 3/16* | (2006.01) | |

(52) U.S. Cl.
CPC ............ *H01S 3/0057* (2013.01); *H01S 3/235* (2013.01); *H01S 3/2325* (2013.01); *H01S 3/0811* (2013.01); *H01S 3/0816* (2013.01); *H01S 3/1066* (2013.01); *H01S 3/1618* (2013.01); *H01S 3/1675* (2013.01)

(58) Field of Classification Search
CPC ...... H01S 3/0057; H01S 3/235; H01S 3/0811; H01S 3/0816; H01S 3/1066; H01S 3/1618; H01S 3/1675; H01S 3/1225
See application file for complete search history.

(56) References Cited

U.S. PATENT DOCUMENTS

| | | | | |
|---|---|---|---|---|
| 2010/0085994 | A1* | 4/2010 | Resan | H01S 3/1112 372/25 |
| 2011/0206070 | A1* | 8/2011 | Karavitis | H01S 3/0057 372/25 |
| 2011/0206071 | A1* | 8/2011 | Karavitis | H01S 3/0057 372/25 |

* cited by examiner

*Primary Examiner* — Kinam Park
(74) *Attorney, Agent, or Firm* — Condo Roccia Koptiw LLP

(57) ABSTRACT

Disclosed is a laser system that includes a femtosecond oscillator, a regenerative amplifier for chirped pulse amplification of femtosecond laser pulses, and a compressor. The regenerative amplifier includes a plurality of positive Group Delay Dispersion (GDD) mirrors disposed within a cavity of the regenerative amplifier. The compressor receives amplified laser pulses from the regenerative amplifier.

1 Claim, 5 Drawing Sheets

USE OF POSITIVE DISPERSION MIRRORS TO MAINTAIN BEAM QUALITY DURING CHIRPED PULSE AMPLIFICATION IN A YB:KYW REGENERATIVE AMPLIFIER

CROSS-REFERENCE TO RELATED APPLICATIONS

This application claims priority from U.S. Provisional Application No. 62/841,750, filed May 1, 2019, the contents of which are hereby incorporated by reference herein.

BACKGROUND

Ultrafast lasers are utilized in a wide variety of fields. Most recently they have found uses in ophthalmic procedures and processing of materials which, historically, have been difficult to cut. As a result, lasers with increasingly high pulse energies and superior beam quality are necessary.

In order to amplify ultrafast pulses a process known as chirped pulse amplification is typically utilized. This process requires that the pulsewidth of a seed laser be temporally stretched before being injected into a laser amplifier and then recompressed once amplification has been accomplished.

Conventionally, the stretching of a laser pulse is accomplished through the use of reflective gratings in an optical setup commonly referred to as a Stretcher. Unfortunately, Stretchers are inherently lossy and the means by which they chirp the pulse can cause distortion of the laser beam. In order to avoid these losses and beam distortion we have designed, and built, a novel Yb:KYW regenerative amplifier for chirped pulse amplification of femtosecond laser pulses without a conventional Stretcher. Instead, our design utilizes positive dispersion mirrors within the amplifier cavity to elongate the laser pulse with each round trip through the cavity. This greatly simplifies alignment and maintains beam quality while dropping peak powers in the laser cavity to levels usually achieved through the use of a conventional stretcher.

SUMMARY

Conventional ultrafast laser systems are composed of a laser oscillator, stretcher, pulse-picker, laser amplifier, and an optical pulse compressor. Our design eliminates the need for a stretcher through the use of positive GDD intracavity mirrors and a pre-chirped femtosecond oscillator. The amplified laser pulse is then compressed using a single transmissive grating which maintains beam quality.

Figure 1:
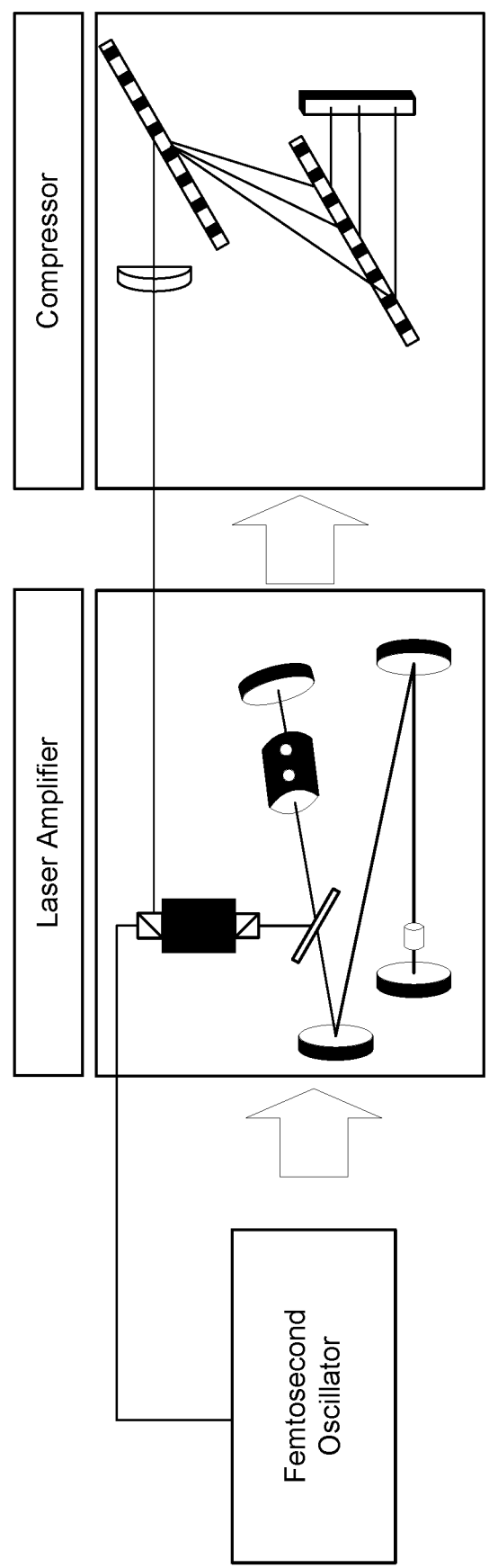
Figure 2:
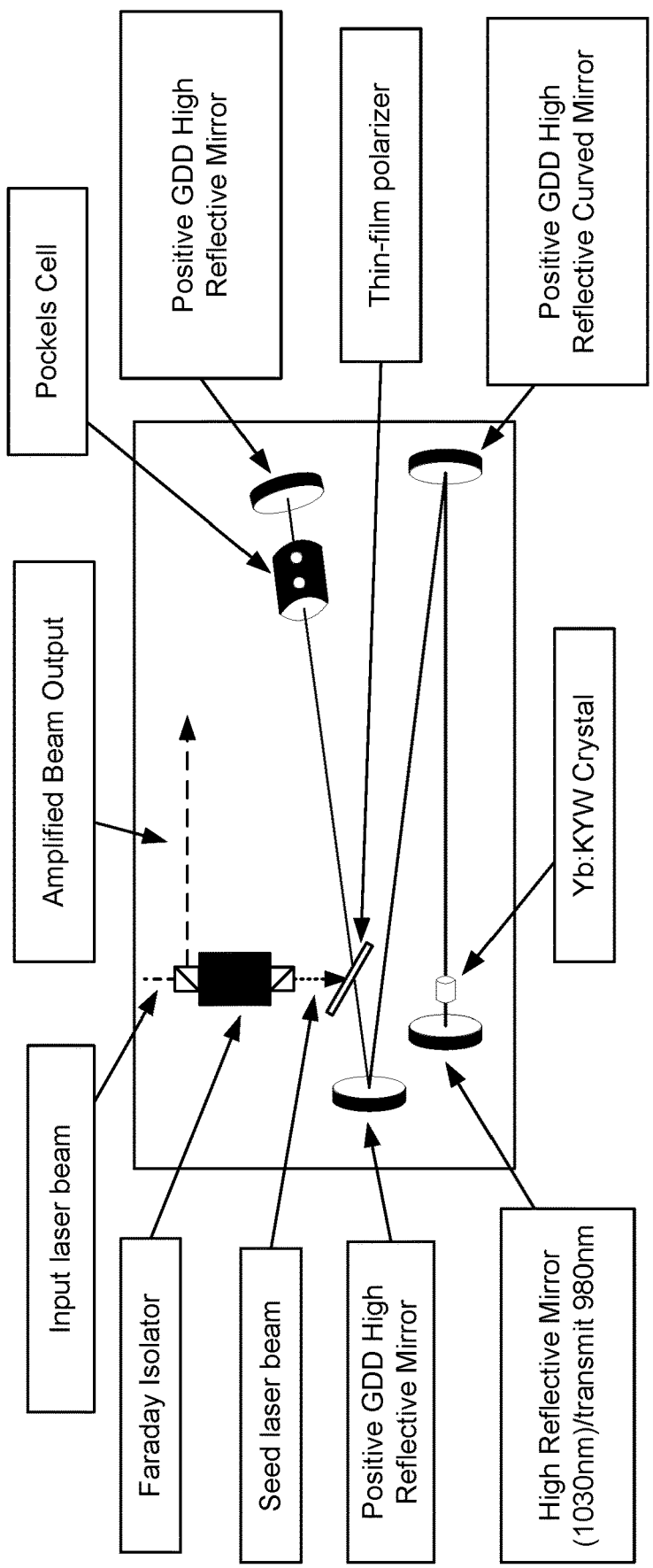
Figure 3:
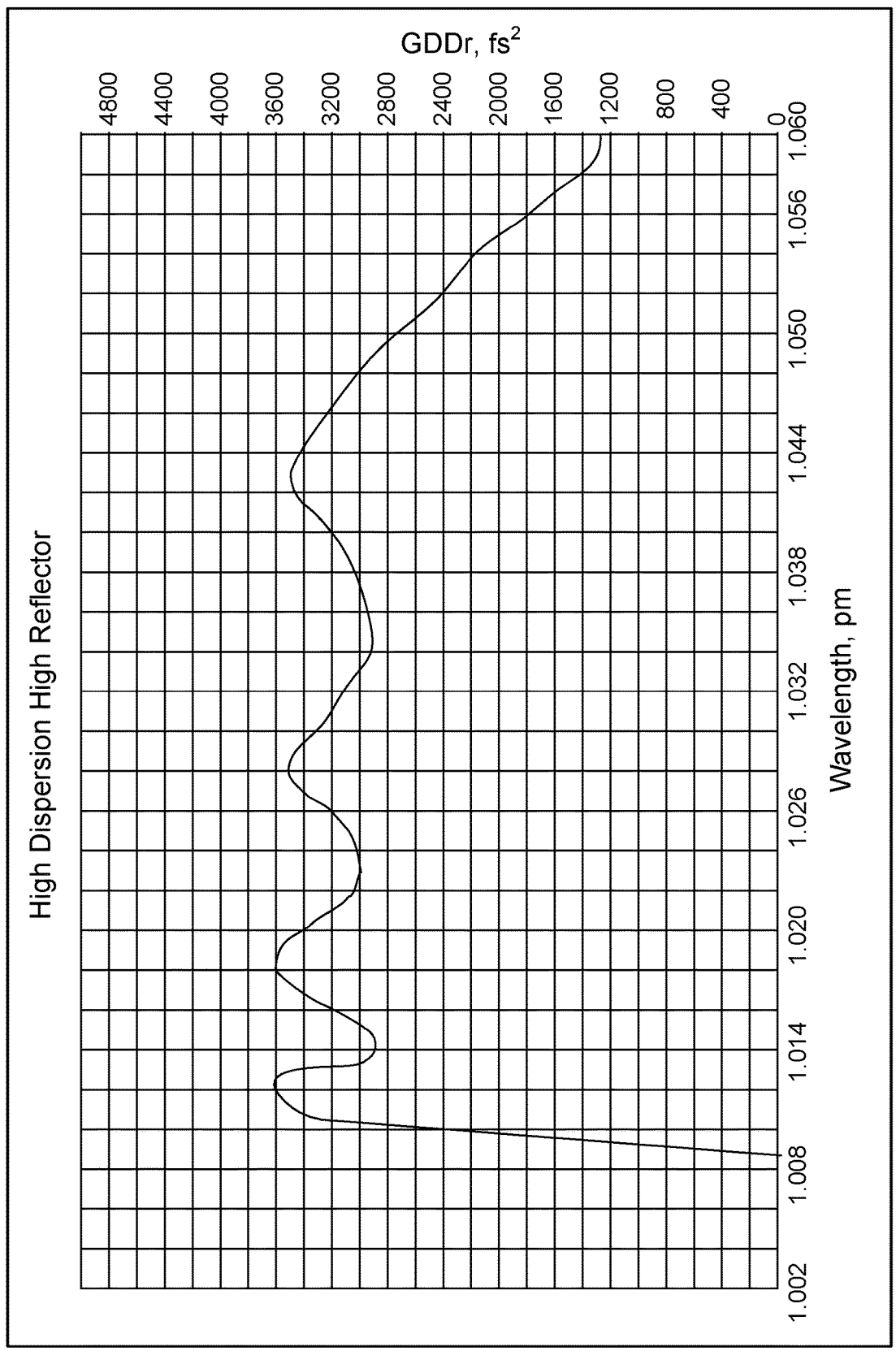
Figure 4:
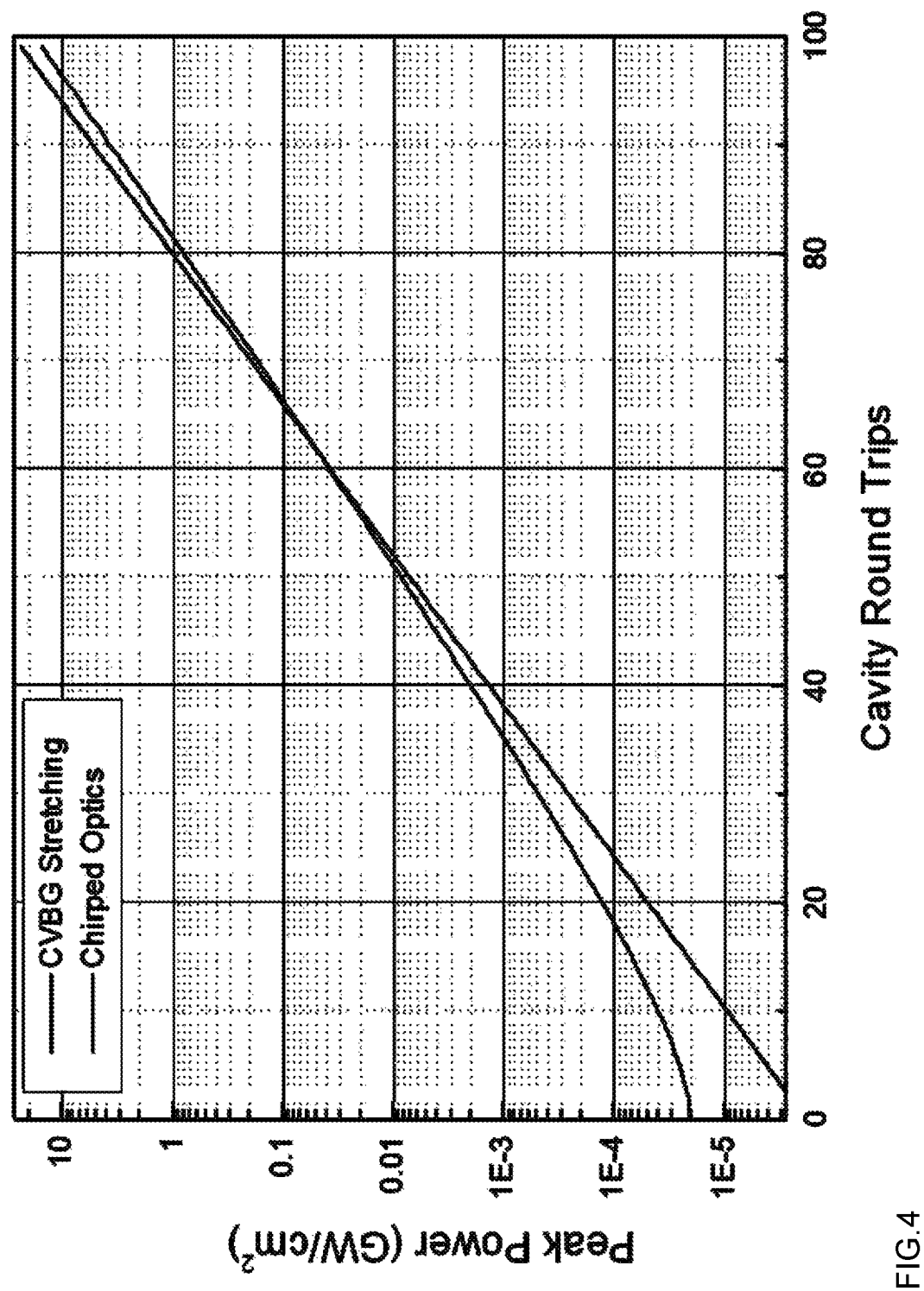
Figure 5:
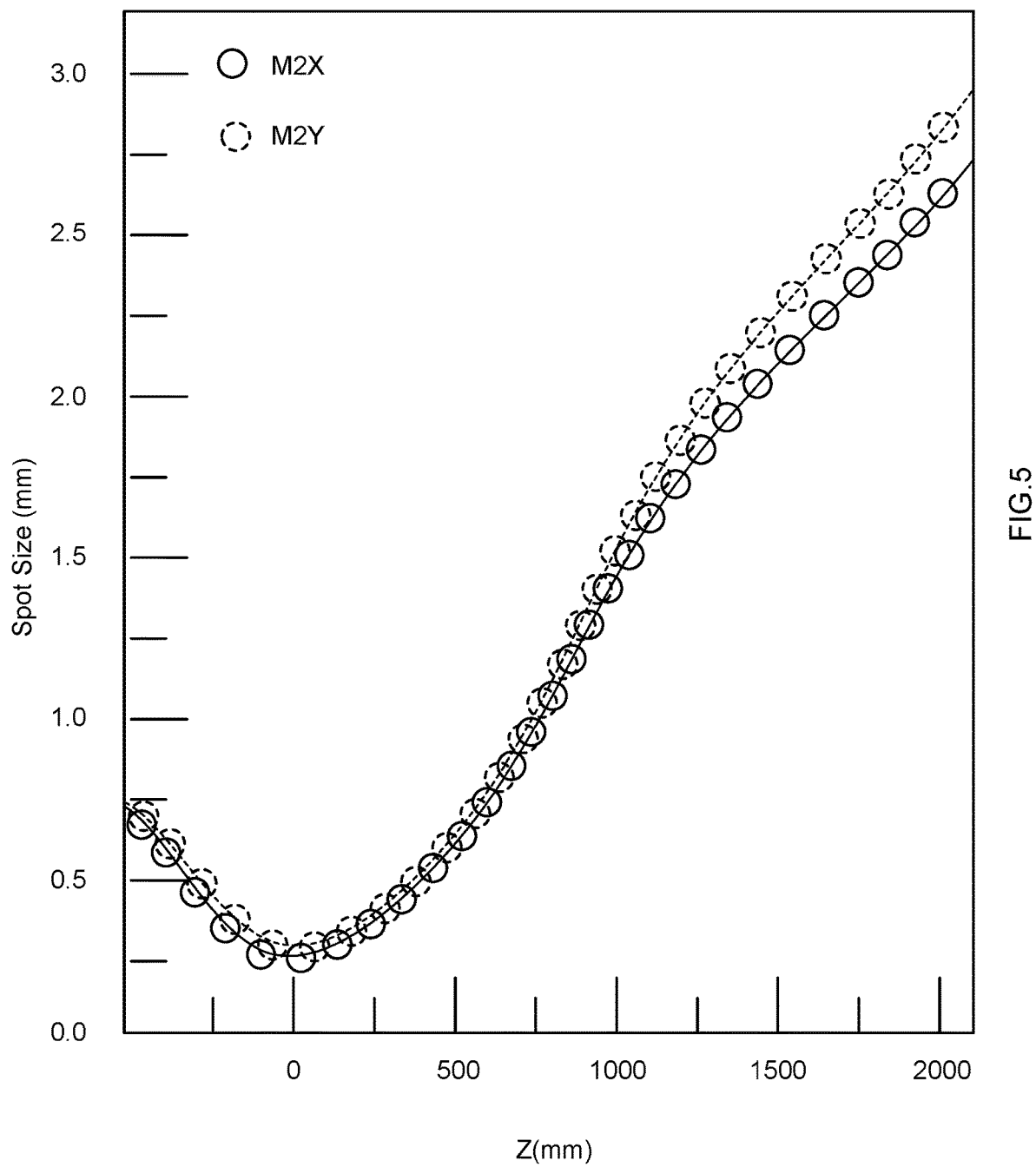

FIG. 1 depicts a laser system.
FIG. 2 depicts a regenerative amplifier.
FIG. 3 provides a dispersion curve of positive GDD mirrors utilized in laser cavity.
FIG. 4 provides a comparison of intracavity peak powers of pulses stretched by a Chirped Volume Bragg Grating (CVBG) and Positive GDD mirrors (Chirped Optics).
FIG. 5 provides a mode quality (M2) plot of the laser cavity.

DETAILED DESCRIPTION

FIG. 1 is an overview of a laser system. As shown, the laser system includes a femtosecond oscillator, a regenerative amplifier, and a compressor.

FIG. 2 depicts the components of a regenerative laser amplifier cavity containing positive dispersion mirrors. As shown in FIG. 2, multiple positive Group Delay Dispersion (GDD) mirrors may be utilized throughout the cavity. The coating of the mirrors was custom designed for this application and each one provides ~4000 $fs^2$ of dispersion to the input laser pulse per reflection. FIG. 3 provides a dispersion curve of positive GDD mirrors utilized in laser cavity.

The seed laser beam reflects offs the positive GDD mirrors as it cycles through the laser amplifier cavity. During each cycle through the amplifier cavity, or "round trip," the seed laser pulse is amplified. In order to reach the desired pulse energy, the seed laser must complete numerous round trips. The peak power of the laser pulses as it cycles through the cavity would damage the cavity optics if it was not temporally stretched. The positive GDD mirrors accomplish the stretching and keep the intracavity peak powers at levels comparable to lasers where a chirped volume Bragg grating (CVBG) is used for pulse stretching prior to amplification as shown in FIG. 4.

However, unlike a system utilizing a CVBG, the input and output beam profiles of our laser are not compromised by the stretching and compressing optics. Through the use of the positive GDD mirrors for stretching then compressing by several passes through a single, conventional, transmission grating our beam profile is dependent solely upon our laser amplifier cavity design. The design of which delivers a highly symmetric beam with a mode quality (M2) value less than 1.3 as shown in FIG. 5.

In addition to superior beam quality the use of positive dispersion mirrors also allows for our laser to operate and dynamically switch repetition rate from single-shot to 1 MHz without compromising laser performance (see Table 1 below, which provides laser output energy at operating repetition rates).

| Repetition Rate (kHz) | Max. Energy (µJ) | Peak Power (MW) |
|---|---|---|
| 20* | 150.0 | 300.0 |
| 40 | 75.0 | 150.0 |
| 60 | 50.0 | 100.0 |
| 80 | 37.5 | 75.0 |
| 100 | 30.0 | 60.0 |
| 200 | 15.0 | 30.0 |
| 300 | 10.0 | 20.0 |
| 400 | 7.5 | 15.0 |
| 500 | 6.0 | 12.0 |
| 600 | 5.0 | 10.0 |
| 700 | 4.3 | 8.6 |
| 800 | 3.8 | 7.5 |
| 900 | 3.3 | 6.7 |
| 1000 | 3.0 | 6.0 |

Finally, as a result of our novel design the laser can operate over a large range of environmental conditions and use models (see Table 2 below, which provides laser specifications of novel ultrafast laser system).

| | |
|---|---|
| Wavelength (nm) | 1030 (+/−2) |
| Average Power (W) | ≥3 (Low Cost Model) |
| Pulse Duration (fs) | <500 |
| Repetition Rate (kHz) | S5-1000 |
| Mode Quality (M2) | <1.35 |
| Pulse to Pulse Stability | 1% over 10 minutes |
| Pulse Contrast | >20:1 |
| Start Up Time (Warm) | 2 minutes |
| Operating Temperature | 15 C.-40 C. |
| Humidity | 90% noncondensing |
| Cooling | Water (closed-loop) |
| Power Requirements | 110 V/15 A (50 Hz/60 Hz) |

-continued

| Laser Head Dimensions | <450 mm × 350 mm × 220 mm |
|---|---|
| Weight (kg) | <22 |

What is claimed is:

1. A laser system comprising:
   a femtosecond oscillator;
   a regenerative amplifier for chirped pulse amplification of femtosecond laser pulses, the regenerative amplifier comprising a plurality of positive Group Delay Dispersion (GDD) mirrors disposed within a cavity of the regenerative amplifier; and
   a compressor that receives an amplified laser pulse from the regenerative amplifier.

* * * * *